US011861816B2

United States Patent
Kim et al.

(10) Patent No.: US 11,861,816 B2
(45) Date of Patent: Jan. 2, 2024

(54) SYSTEM AND METHOD FOR DETECTING IMAGE FORGERY THROUGH CONVOLUTIONAL NEURAL NETWORK AND METHOD FOR PROVIDING NON-MANIPULATION DETECTION SERVICE USING THE SAME

(71) Applicant: NHN CLOUD CORPORATION, Gyeonggi-do (KR)

(72) Inventors: Hyeon-gi Kim, Gyeonggi-do (KR); Rokkyu Lee, Gyeonggi-do (KR)

(73) Assignee: NHN CLOUD CORPORATION, Gyeonggi-Do (KR)

( * ) Notice: Subject to any disclaimer, the term of this patent is extended or adjusted under 35 U.S.C. 154(b) by 491 days.

(21) Appl. No.: 16/657,994

(22) Filed: Oct. 18, 2019

(65) Prior Publication Data
US 2020/0126209 A1    Apr. 23, 2020

(30) Foreign Application Priority Data

Oct. 18, 2018    (KR) .................... 10-2018-0124376

(51) Int. Cl.
*G06T 7/00*    (2017.01)
*G06T 5/20*    (2006.01)
(Continued)

(52) U.S. Cl.
CPC ............. *G06T 7/0002* (2013.01); *G06N 3/04* (2013.01); *G06N 3/08* (2013.01); *G06T 5/20* (2013.01);
(Continued)

(58) Field of Classification Search
CPC ................................. G06T 5/20; G06T 5/10; G06T 7/0002; G06T 7/00; G06T 7/0004; G06T 7/0008;
(Continued)

(56) References Cited

U.S. PATENT DOCUMENTS 10,803,301 B1 * 10/2020 Farivar .............. G06K 9/00228
10,872,262 B2    12/2020 Yano et al.
(Continued)

FOREIGN PATENT DOCUMENTS

CN    107292230 A * 10/2017 ......... G06K 9/00885
JP    2012-151789    8/2012
(Continued)

OTHER PUBLICATIONS

M. T. H. Majumder and A. B. M. Alim Al Islam, "A Tale of a Deep Learning Approach to Image Forgery Detection," 2018 5th International Conference on Networking, Systems and Security (NSysS), 2018, pp. 1-9, doi: 10.1109/NSysS.2018.8631389. (Year: 2018).*
(Continued)

*Primary Examiner* — Andrew M Moyer
(74) *Attorney, Agent, or Firm* — Ladas & Parry, LLP

(57) ABSTRACT

A system and a method for detecting image forgery through a convolutional neural network are capable of detecting image manipulation of compressed and/or color images. The system comprises a manipulated feature pre-processing unit applying an input image to a high-pass filter to enhance features due to image forgery; a manipulated feature extraction unit extracting image manipulated feature information from the image with the enhanced features through a pre-trained convolutional neural network; a feature refining unit refining the extracted image manipulated feature information; and a manipulation classifying unit determining the image forgery based on the image manipulated feature information refined by the feature refining unit.

12 Claims, 13 Drawing Sheets

(a) Original image and forged image by splicing and blurring (b) Detection result of the original image and forgery image due to splicing and blurring (c) Original image and forged image by resampling (d) Detection result of the original image and forgery image due to resampling (e) Original image and forged image by splicing and median filtering (f) Detection result of the original image and forgery image due to splicing and median filtering

(51) Int. Cl.
 G06N 3/04 (2023.01)
 G06N 3/08 (2023.01)
(52) U.S. Cl.
 CPC ............... *G06T 2207/10024* (2013.01); *G06T 2207/20021* (2013.01); *G06T 2207/20081* (2013.01); *G06T 2207/20084* (2013.01)
(58) Field of Classification Search
 CPC . G06T 2207/10024; G06T 2207/20021; G06T 2207/20; G06T 2207/2008; G06T 2207/2012; G06T 2207/20081; G06T 2207/20076; G06T 2207/20084; G06T 5/003; G06T 3/40; G06T 7/11; G06N 3/04; G06N 3/0436; G06N 3/0454; G06N 3/0445; G06N 3/0409; G06N 3/08; G06N 3/045; G06N 3/047; G06F 21/16; G06F 21/60
 USPC ................. 382/155–159, 100, 165, 170, 309
 See application file for complete search history.

(56) References Cited

U.S. PATENT DOCUMENTS

| | | | | |
|---|---|---|---|---|
| 10,878,540 | B1* | 12/2020 | Stevens | G09G 5/026 |
| 2014/0294272 | A1* | 10/2014 | Madabhushi | G06T 7/12 382/131 |
| 2017/0032285 | A1 | 2/2017 | Sharma et al. | |
| 2018/0101751 | A1 | 4/2018 | Ghosh et al. | |
| 2019/0122072 | A1* | 4/2019 | Cricr | G06K 9/6277 |
| 2019/0205688 | A1 | 7/2019 | Yano et al. | |
| 2019/0295223 | A1* | 9/2019 | Shen | G06N 3/0454 |
| 2019/0318156 | A1* | 10/2019 | Wu | G06V 10/82 |
| 2020/0329233 | A1* | 10/2020 | Nemirofsky | H04N 19/176 |
| 2020/0349682 | A1* | 11/2020 | Mayol Cuevas | G06N 3/08 |

FOREIGN PATENT DOCUMENTS

| | | |
|---|---|---|
| JP | 2017-191501 | 10/2017 |
| KR | 10-1861708 | 5/2018 |
| KR | 10-1881505 | 7/2018 |

OTHER PUBLICATIONS

T. Pomari, G. Ruppert, E. Rezende, A. Rocha and T. Carvalho, "Image Splicing Detection Through Illumination Inconsistencies and Deep Learning," 2018 25th IEEE International Conference on Image Processing (ICIP), 2018, pp. 3788-3792, doi: 10.1109/ICIP. 2018.8451227. (Year: 2018).*

R. Agarwal, D. Khudaniya, A. Gupta and K. Grover, "Image Forgery Detection and Deep Learning Techniques: A Review," 2020 4th International Conference on Intelligent Computing and Control Systems (ICICCS), 2020, pp. 1096-1100, doi: 10.1109/ICICCS48265. 2020.9121083. (Year: 2020).*

Mo, Huaxiao, Bolin Chen and Weiqi Luo. "Fake Faces Identification via Convolutional Neural Network." Proceedings of the 6th ACM Workshop on Information Hiding and Multimedia Security (2018): n. pag. (Year: 2018).*

K. Bong, S. Choi, C. Kim, D. Han and H. -J. Yoo, "A Low-Power Convolutional Neural Network Face Recognition Processor and a CIS Integrated With Always-on Face Detector," in IEEE Journal of Solid-State Circuits, vol. 53, No. 1, pp. 115-123, Jan. 2018, doi: 10.1109/JSSC.2017.2767705. (Year: 2018).*

B. Singh and D. K. Sharma, "Image Forgery over Social Media Platforms—A Deep Learning Approach for its Detection and Localization," 2021 8th International Conference on Computing for Sustainable Global Development (INDIACom), 2021, pp. 705-709, doi: 10.1109/INDIACom51348.2021.00125. (Year: 2021).*

Huh, Minyoung, et al. "Fighting fake news: Image splice detection via learned self-consistency." Proceedings of the European conference on computer vision (ECCV). Sep. 2018. (Year: 2018).*

Wu, Yue, Wael Abd-Almageed, and Prem Natarajan. "Deep matching and validation network: An end-to-end solution to constrained image splicing localization and detection." Proceedings of the 25th ACM international conference on Multimedia. 2017. (Year: 2017).*

Belhassen Bayar and Matthew C Stamm. "A deep learning Approach to Universal Image Manipulation Detection Using a New Convolutional Layer. In Proceedings of the 4th ACM Workshop on Information Hiding and Multimedia Security".

Office Action dated Jan. 23, 2020 for Korean Patent Application No. 10-2018-0124376 and its English translation from Global Dossier.

Kim, H.-G. et al.: "Two-Stream neural networks to detect manipulation of JPEG compressed images", Electronic Letters, Mar. 22, 2018, vol. 54 No. 6, pp. 354-355.

Notice of Allowance dated Jul. 8, 2020 for Korean Patent Application No. 10-2018-0124376 and its English translation from Global Dossier.

Haijiao Xu et al.: "Combining Convolutional Neural Network and Markov Random Field for Semantic Image Retrieval", Published Aug. 1, 2018, vol. 2018, Article ID 6153607, pp. 1-12.

Office Action dated Dec. 1, 2020 for Japanese Patent Application No. 2019-191482 and its English translation from Global Dossier.

Hak-Yeol Choi et al.: "Detecting Composite Image Manipulation based on Deep Neural Networks", 2017 International Conference on Systems, Signals and Image Processing (IWSSIP), IEEE May 24, 2017, pp. 1-5.

Karen Simonyan et al.: "Very Deep Convolutional Networks for Large-Scale Image Recognition", arxiv:1409.1556v6, Apr. 10, 2015, pp. 1-14.

Notice of Allowance dated Sep. 21, 2021 for Japanese Patent Application No. 2019-191482 and its English translation from Global Dossier.

* cited by examiner

FIG. 5

   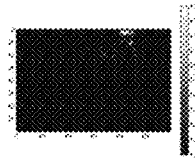 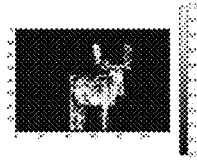

(a) Original image and forged image by splicing and blurring (b) Detection result of the original image and forgery image due to splicing and blurring

 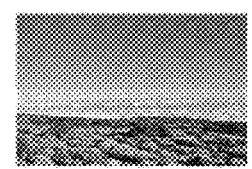  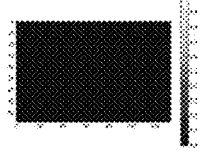 

(c) Original image and forged image by resampling (d) Detection result of the original image and forgery image due to resampling

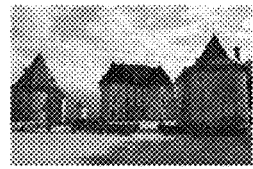   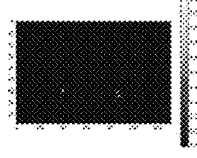 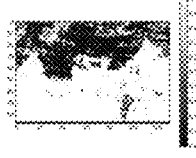

(e) Original image and forged image by splicing and median filtering (f) Detection result of the original image and forgery image due to splicing and median filtering

SYSTEM AND METHOD FOR DETECTING IMAGE FORGERY THROUGH CONVOLUTIONAL NEURAL NETWORK AND METHOD FOR PROVIDING NON-MANIPULATION DETECTION SERVICE USING THE SAME

CROSS REFERENCE TO RELATED APPLICATION(S)

This application claims the priority to Korean Patent Application No. 10-2018-0124376, filed on Oct. 18, 2018, which is all hereby incorporated by reference in its entirety.

BACKGROUND

Technical Field

The present disclosure generally relates to a system for detecting image forgery through a convolutional neural network and a method for providing a non-manipulation detection service by using the system. More specifically, some embodiments of the present disclosure relate to a deep learning-based forgery detection system which can accurately determine whether an image has been manipulated or not and a method for providing a non-manipulation detection service by using the system.

Related Art

Due to advances in digital camera and mobile phone technologies, anyone is now able to create high quality digital images. In particular, Social Network Services (SNS) may be used to upload and share images, thereby distributing photos to other people.

Also, due to proliferation of sophisticated image editing software such as Adobe PhotoShop, image editing function provided by the social network service itself, and various image editing applications, original images may be easily modified. In particular, image forgery may readily occur in many forms such as hiding specific elements of an actual image by using an image retouching technique like blurring, median filtering, Gaussian noise, resampling, cropping, and color modulation, and adding new elements to the actual image by using a method of copy-move or splicing. Therefore, without the help of experts, it is now difficult to prove the integrity of an image, which leads to serious cases where the corresponding forged image may be distributed in the news feed and social network as if it is the original image or traces of forgery are hidden so that the forged image may be accepted as court evidence.

Because of the rapid spread of image editing software, anyone may easily create and distribute images, and in particular, the image forgery may also be accomplished in a simple but sophisticated manner. Techniques for detecting such image forgery have been studied for a long time, but they may be effective only in a very limited operating environment allowing only a specific file format, manipulation, and compression quality.

Image forensic techniques have been studied to detect such image forgery.

Conventional image forensic techniques such as a technique for detecting color variation by analyzing a pattern change, a technique for analyzing resampling traces of an image, and so on have been studied.

However, these techniques may operate with separate operations and file formats and be applicable only to a specific environment, making the techniques difficult to be applied to more diverse operations and formats.

RELATED ART REFERENCES

Belhassen Bayar and Matthew C Stamm. "A deep learning approach to universal image manipulation detection using a new convolutional layer. In Proceedings of the 4th ACM Workshop on Information Hiding and Multimedia Security"

SUMMARY

Digital images may be stored in a compressed format such as JPEG, and in the compressed images, it is difficult to track traces of manipulations due to data loss caused during the compression process.

In particular, image forgery may require recompression, namely double JPEG compression because a JPEG image is manipulated by image editing software such as PhotoShop and then re-saved. For this reason, additional data loss may be occurred in the traces of manipulations.

Therefore, various embodiments of the present disclosure may provide a system for detecting the image forgery through a convolutional neural network capable of detecting image manipulation in an image compress process.

Also, some embodiments of the present disclosure may provide a system for detecting the image forgery through a convolutional neural network capable of accurately detecting manipulation of color images.

Also, certain embodiments of the present disclosure may provide a method for providing a manipulation or non-manipulation detection service by using a system for detecting image forgery through the convolutional neural network.

A system for detecting image forgery through a convolutional neural network according to an embodiment comprises a manipulated feature pre-processing unit applying a high-pass filter to the image and enhancing features due to image forgery; manipulated feature extraction unit extracting image manipulated feature information from the image with enhanced features through a pre-trained convolutional neural network; feature refining unit refining the image manipulated feature information; and manipulation classifying unit determining forgery of the image based on the image manipulated feature information refined by the feature refining unit.

At this time, the system may further include an image block unit which processes the image into blocks of a predetermined size.

Also, the manipulated feature extraction unit may include a plurality of convolutional layers and a plurality of pooling layers.

At this time, the convolutional layer has a kernel size smaller than 3×3 and has a stride of 1.

Also, the manipulated feature extraction unit is based on a pre-trained VGG19 convolutional neural network model, and weights of the convolutional neural network may be changed and trained according to the image.

Also, the manipulation classifying unit may detect pixels that may have been manipulated in the image, calculate manipulation probability values of the pixels, and output an image forgery confirmation map in which pixels with a high possibility of forgery are displayed in different colors according to their probability values.

Also, the input image in question for image forgery may be a color image.

In a method for providing a non-manipulation detection service by using the system for detecting image forgery through a convolutional neural network, the method for providing a non-manipulation detection service according to an embodiment comprises receiving, from a user, an input image in question for image forgery; generating image blocks by processing the input image into blocks of a predetermined size; inputting the image blocks into the system for detecting image forgery through a convolutional neural network and outputting a forgery confirmation map from the system for detecting image forgery through a convolutional neural network; and learning the forgery confirmation map and the input images through deep learning and displaying a determination result of whether forgery has been made in a label of Yes or No.

At this time, if image forgery is determined to be Yes, the method may further include generating an input image highlighting areas with a high possibility of forgery and providing the generated input image to the user.

Also, if image forgery is determined to be No, the method may further include synthesizing a confirmation stamp indicating that no manipulation has been made to the input image and providing the synthesized image to the user.

BRIEF DESCRIPTION OF THE DRAWINGS

FIG. 5 illustrates an experimental result of detecting a forged image by using a system for detecting image forgery through a convolutional neural network according to the first embodiment of the present disclosure.

DESCRIPTION OF EXEMPLARY EMBODIMENTS

Figure 1:
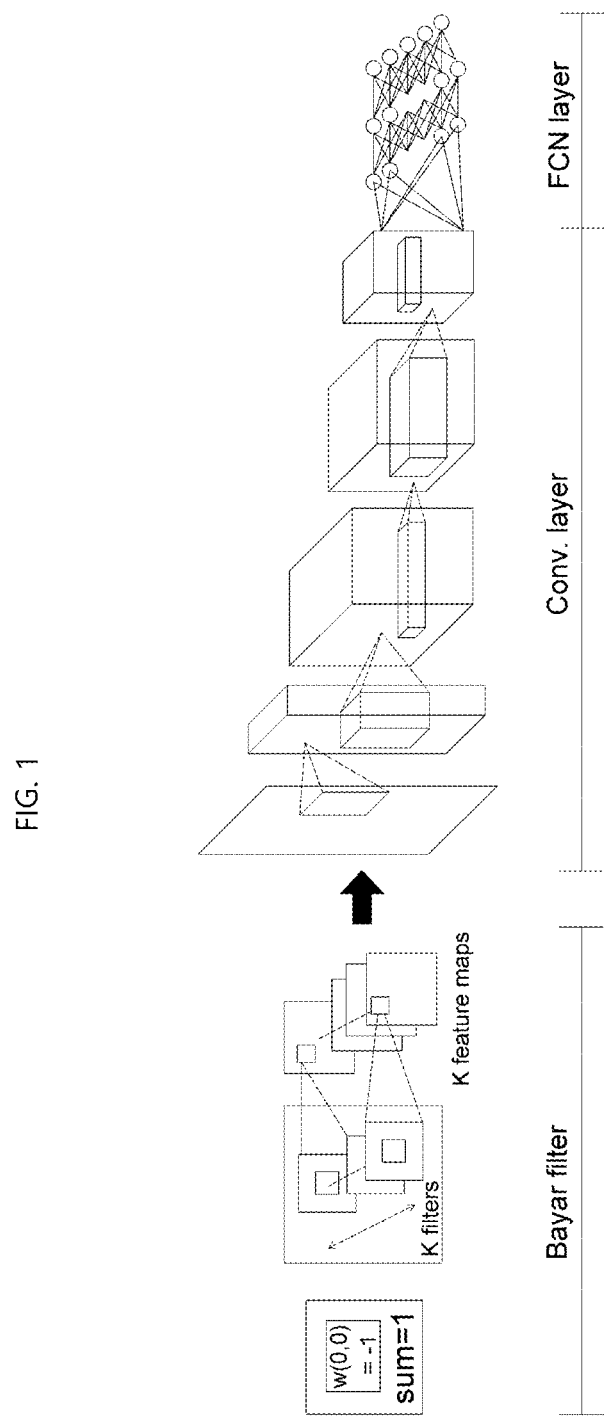
FIG. 1 illustrates a convolutional neural network structure according to an embodiment of the present disclosure.

Since the present disclosure may be modified in various ways and may provide various embodiments, specific embodiments will be depicted in the appended drawings and described in detail with reference to the drawings. The effects and characteristics of the present disclosure and a method for achieving them will be clearly understood by referring to the embodiments described later in detail together with the appended drawings. However, it should be noted that the present disclosure is not limited to the embodiment disclosed below but may be implemented in various forms. In the following embodiments, the terms such as first and second are introduced to distinguish one element from the others, and thus the technical scope of the present disclosure should not be limited by those terms. Also, a singular expression should be understood to indicate a plural expression unless otherwise explicitly stated. The term include or have is used to indicate existence of an embodied feature or constituting element in the present specification; and should not be understood to preclude the possibility of adding one or more other features or constituting elements. Also, constituting elements in the figure may be exaggerated or shrunk for the convenience of descriptions. For example, since the size and thickness of each element in the figure has been arbitrarily modified for the convenience of descriptions, it should be noted that the present disclosure is not necessarily limited to what has been shown in the figure.

In what follows, embodiments of the present disclosure will be described in detail with reference to appended drawings. Throughout the specification, the same or corresponding constituting element is assigned the same reference number, and repeated descriptions thereof will be omitted.

<Terminal>

The neural network structure of a system for detecting image forgery through a convolutional neural network according to embodiments of the present disclosure is constructed via a computer language. A terminal may perform the detection of the image forgery in a way that a processor reads out the computer language from a memory such as a RAM memory, and the processor detects the image forgery by using the convolutional neural network. In the same or similar way, a method for providing a manipulation or non-manipulation detection service according to embodiments of the present disclosure may also be implemented by the processor through execution of a manipulation or non-manipulation detection program.

Therefore, in certain embodiments of the present disclosure, the subject that drives the system for detecting the image forgery through the convolutional neural network may be the processor of the terminal.

The terminal of the system for detecting the image forgery through the convolutional neural network according to an embodiment may include, for example, but not limited to, a processor processing data, information and signals and a memory storing a program or instructions for driving image deep learning for executing image deep learning. The processor reads out the program or instructions for driving the image deep learning and performs the image deep learning described below according to the constructed neural network system.

The processor may be implemented by using at least one of Application Specific Integrated Circuits (ASIC), Digital Signal Processors (DSPs), Digital Signal Processing Devices (DSPDs), Programmable Logic Devices (PLDs), Field Programmable Gate Arrays (FPGAs), controllers, micro-controllers, microprocessors, and electric units for performing other functions.

Also, the memory may be implemented in various forms of storage devices including, for example, but not limited to, ROM, RAM, EPROM, flash drive, and hard drive.

Also, the terminal may further include an image capturing device such as a camera for capturing an image that may be a target of the image forgery or a communication unit.

More specifically, the image capturing device may obtain an image from an image sensor (for example, CMOS or CCD sensor).

Also, a communication unit of the terminal may obtain images from the Internet through a wired or wireless network. The communication unit may include an RF communication interface which includes a communication port and a transmitter transmitting an RF signal. Depending on the embodiments, the system for detecting the image forgery through the convolutional neural network may be configured to include a main processor controlling the entire units and a graphic processing unit (GPU) which processes computations needed to operate a neural network for image deep learning.

The terminal may include a server computer, computer, smart phone, digital broadcast terminal, mobile phone, personal digital assistant (PDA), portable multimedia player (PMP), navigation terminal, tablet pc, and wearable device in which the program for detecting image forgery through a convolutional neural network is installed.

A program for detecting the image forgery through the convolutional neural network and a program for providing the manipulation or non-manipulation detection service may be provided through a network, and a final service or output may be provided by a terminal through data exchange between the terminal and a server.

FIG. 1 illustrates a neural network structure based on deep learning, which is characterized in that a Bayar filter specialized to image forensic techniques is included in the front layer of the convolutional neural network. The Bayar filter enables the convolutional neural network to better adapt to and learn image variations based only on a layered structure without involving any pre-processing or feature extraction step, thereby improving the performance of image forgery detection.

$$\begin{cases} w_k^{(1)}(0, 0) = -1 \\ \sum_{l,m \neq 0} w_k^{(1)}(l, m) = 1 \end{cases} \qquad \text{[Equation 1]}$$

More specifically, as indicated in Equation 1, the central weight of the Bayar filter is fixed to −1, and the learning is progressed so that a sum of its neighboring weight values is forced to be 1. Here,], m denote the coordinates of a pixel.

The neural network of the embodiment of FIG. 1 employing the Bayar filter is very effective in detecting changes such as blur, noise, median, or resizing the uncompressed image.

However, in the embodiment of FIG. 1, it may be difficult to track traces of forgery of compressed images due to data loss caused during a compression process.

Also, the embodiment of FIG. 1 specializes in grayscale images and may not be effective for detecting traces of forgery in color images.

Figure 2:
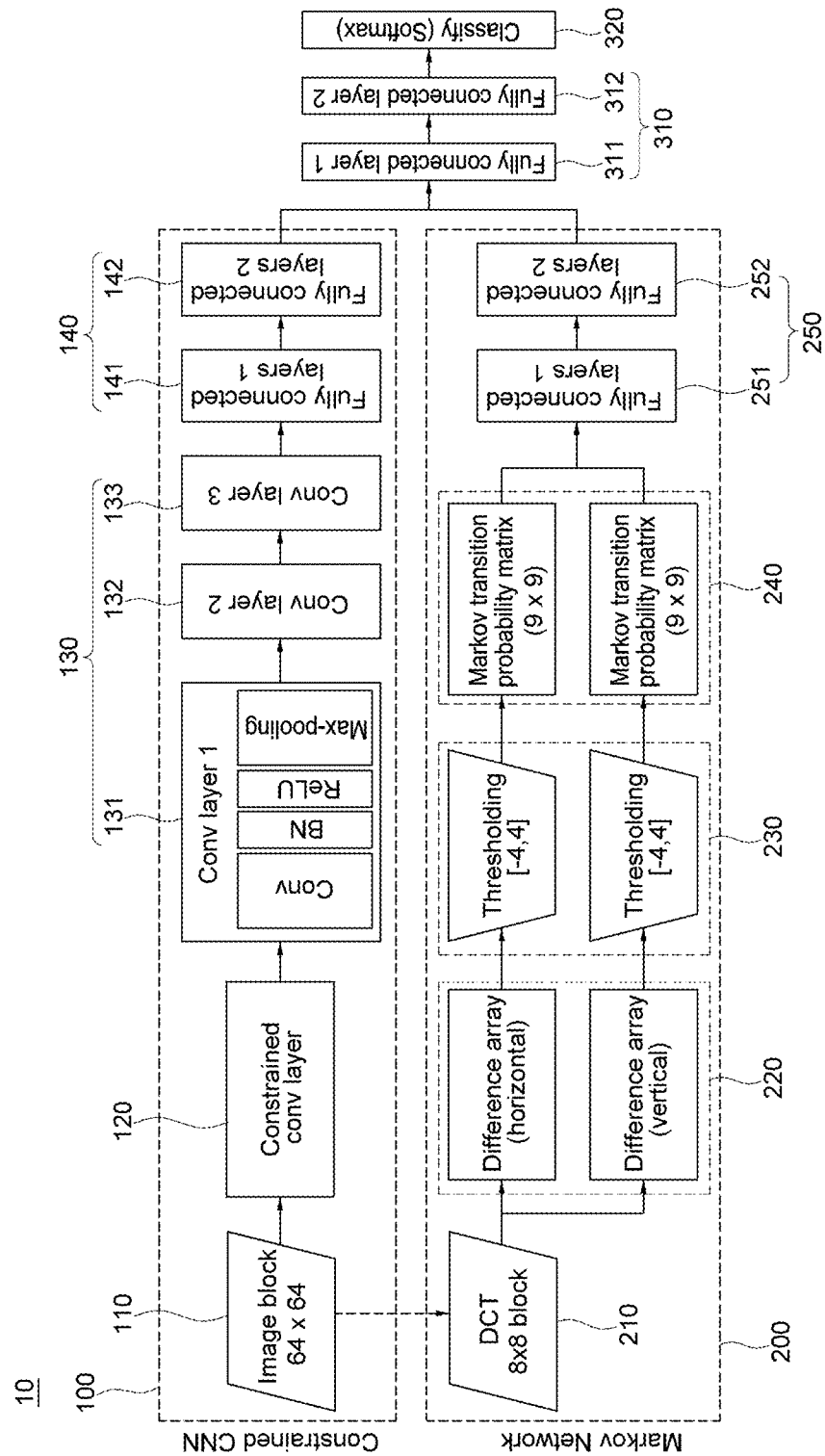
FIG. 2 illustrates a block diagram of a system for detecting image forgery through a convolutional neural network according to a first embodiment of the present disclosure.

First Embodiment—System for Detecting Image Forgery Through Convolutional Neural Network FIG. 2 illustrates a block diagram of a system for detecting image manipulation through a convolutional neural network according to a first embodiment of the present disclosure.

Referring to FIG. 2, the system 10 for detecting image manipulation through a convolutional neural network according to the first embodiment may be built on a two-stream neural network structure. The system 10 may include a convolutional neural network 100, a neural network 200, a manipulated feature refining unit 310, and a manipulation classifying unit 320. The convolutional neural network 100 may be specialized to image forensic techniques so as to detect image manipulation attempted in various compression environments. The neural network 200 may be based on Markov statistics which take into account image compression. The manipulated feature refining unit 310 and manipulation classifying unit 320 may refine features of a corrected or manipulated image extracted from the neural network 200 and determining whether an image has been manipulated.

1. Two Stream Neural Network Structure and Input Data

The structure of a two stream neural network of the system 10 for detecting image manipulation through the convolutional neural network according to an embodiment is shown in FIG. 2.

More specifically, the system 10 for detecting image manipulation through the convolutional neural network may be built on a two-stream network structure which combines the constrained convolutional neural network 100 detecting image manipulation and the neural network 200 based on Markov statistics taking into account compression.

According to certain embodiments of the present disclosure, to solve the problem that existing convolutional neural networks are not be applied directly to the digital image forensic techniques, the two-stream neural network structure may deal with image manipulation even in the frequency domain different from previous researches that consider image manipulation only in the pixel domain and thus may be specialized to detect the manipulation of an image which has been compressed at least more than once.

In the embodiment, an input image can be examined for image manipulation. In other words, the embodiment may distinguish a normal image block within a JPEG-compressed image from a manipulated image block within the JPEG-compressed image. In a real situation of image manipulation, a JPEG-compressed image is retrieved through image editing software, the image is manipulated locally, and then re-saved for distribution. Since the manipulated image again undergoes the JPEG compression process when it is re-saved, both of a manipulated and normal areas are doubly compressed, and in this regard, it is necessary to distinguish the two areas from each other. Among the types of image forgery techniques described above, copy-move and splicing employ blurring or median filtering to conceal traces of image manipulation and also involve resampling to make the pasted object look natural with the other portions of the image. Therefore, in what follows, descriptions will be given with respect to detection of image forgery in a JPEG-compressed image.

Constrained Convolutional Neural Network (CNN) 100

Figure 3:
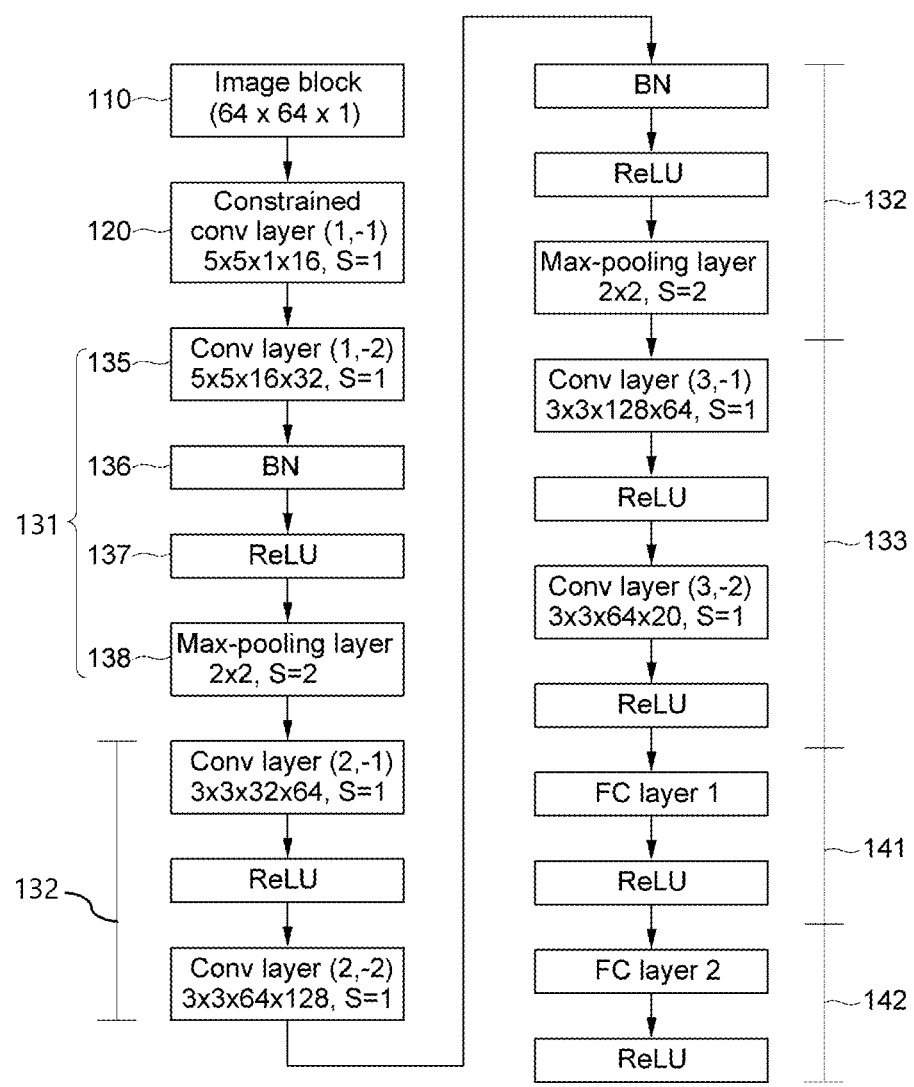
FIG. 3 illustrates a block diagram of a constrained convolutional neural network according to the first embodiment of the present disclosure.

Referring to FIGS. 2 to 3, a constrained convolutional neural network 100 according to an embodiment may include an image block unit 110, manipulated feature pre-processing unit 120, manipulated feature extraction unit 130, and first feature refining unit 140.

More specifically, the image block unit 110 may partition an input image into a plurality of blocks with a size suitable to be used as inputs to the convolutional neural network or a predetermined size. For example, the image block unit 110 may divide the input image into the blocks so that the size of each individual image block can be sixty four by sixty four (64×64).

Next, the image blocks are input to the manipulated feature pre-processing unit 120 and the manipulated feature pre-processing unit 120 pre-process the partitioned image blocks.

More specifically, the manipulated feature pre-processing unit 120 includes a constrained convolution layer. For example, the constrained convolution layer may operate according to Equation 1 in the same or similar way as or to the Bayar filter of the embodiment of FIG. 1.

Next, the image pre-processed and output from the manipulated feature pre-processing unit 120 may be input to the manipulated feature extraction unit 130.

The manipulated feature extraction unit 130 may include a plurality of layers, and each layer may include a convolutional layer, a batch normalization, rectified linear unit (ReLU), and a max pooling layer.

More specifically, referring to FIG. 3, the manipulated feature extraction unit 130 includes a first layer 131, a second layer 132, and a third layer 133. Each of the layers 131 to 133 may include a convolutional layer 135, a batch normalization 136, and a rectified linear unit function 137. The first layer 131 and the second layer 132 may further include a max pooling layer 138.

In other words, the feature extraction unit 130 comprises a plurality of convolutional layers. For instance, in order to stack a plurality of layers, the kernel size of a convolutional layer belonging to the manipulated feature extraction unit 130 is less than five-by-five (5×5).

It is preferable that the kernel size of convolutional layers after the second one is less than three-by-three (3×3). Also, the stride of each convolutional layer may be fixed to one (1) not to miss traces of image manipulation, and only the pooling layer may be set to an integer of two (2) or more.

More specifically, the reason for using a small sized filter for a convolutional layer is that several rectified linear units (ReLUs) may be used. This scheme may allow to replace a layer which uses a single large filter with a plurality of layers employing small sized filters. Additionally, the use of small sized filters may reduce the number of weights to be learned. A smaller number of weights are required when three three-by-three (3×3) convolutional layers are used in comparison to the case of using a single seven-by-seven (7×7) convolutional layer as described in the embodiment of FIG. 1. A small number of weights to be learned may give a great advantage in terms of normalization.

Also, batch normalization may be used to prevent overfitting of a proposed network.

The manipulated features extracted through the manipulated feature extraction unit 130 may be output or delivered to the first feature refining unit 140.

The first feature refining unit 140 may include one or more fully connected layers and may be trained to refine and distinguish the image manipulated features extracted by the manipulated feature extraction unit 130.

In the embodiment, the first feature refining unit 140 may comprise two fully connected layers (FC layer) 141, 142 where a rectified linear unit (ReLU) is connected to the output of each fully connected layer.

The manipulated features rectified by the first feature refining unit 140 as well as manipulated features extracted by the Markov statistics-based network 200 are input or delivered to an integrated feature refining unit 310.

3. Markov Statistics-Based Network 200

A Markov statistics-based network 200 according to an embodiment may distinguish single JPEG compression from double JPEG compression and detect whether an image has been manipulated during double JPEG compression.

The Markov statistics-based network 200 may be used to detect or examine image forgery even in the frequency domain, thereby detecting image manipulation effectively for JPEG compressed images.

Figure 4:
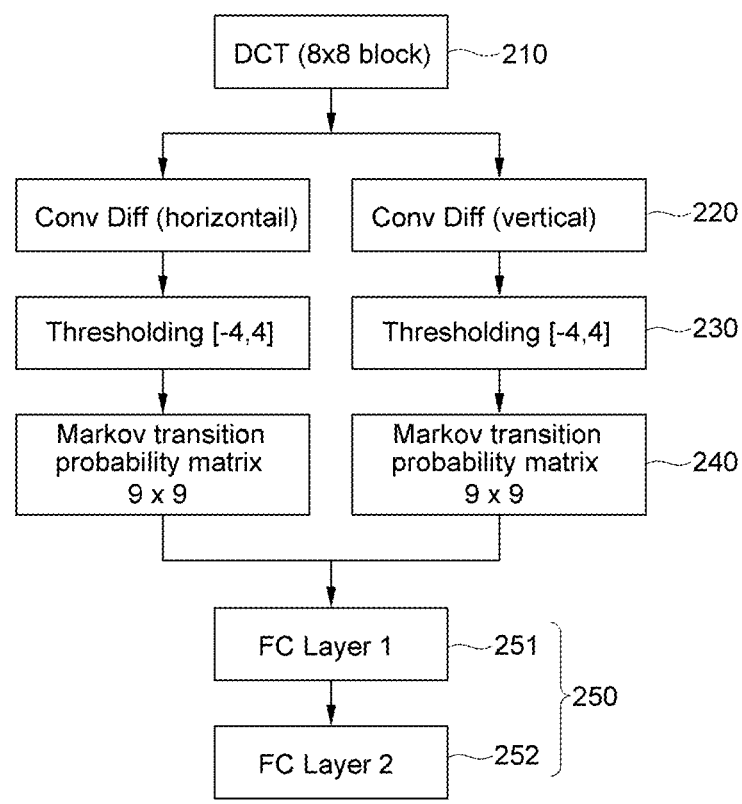
FIG. 4 illustrates a block diagram of a Markov network according to the first embodiment of the present disclosure.
Figure 6A:
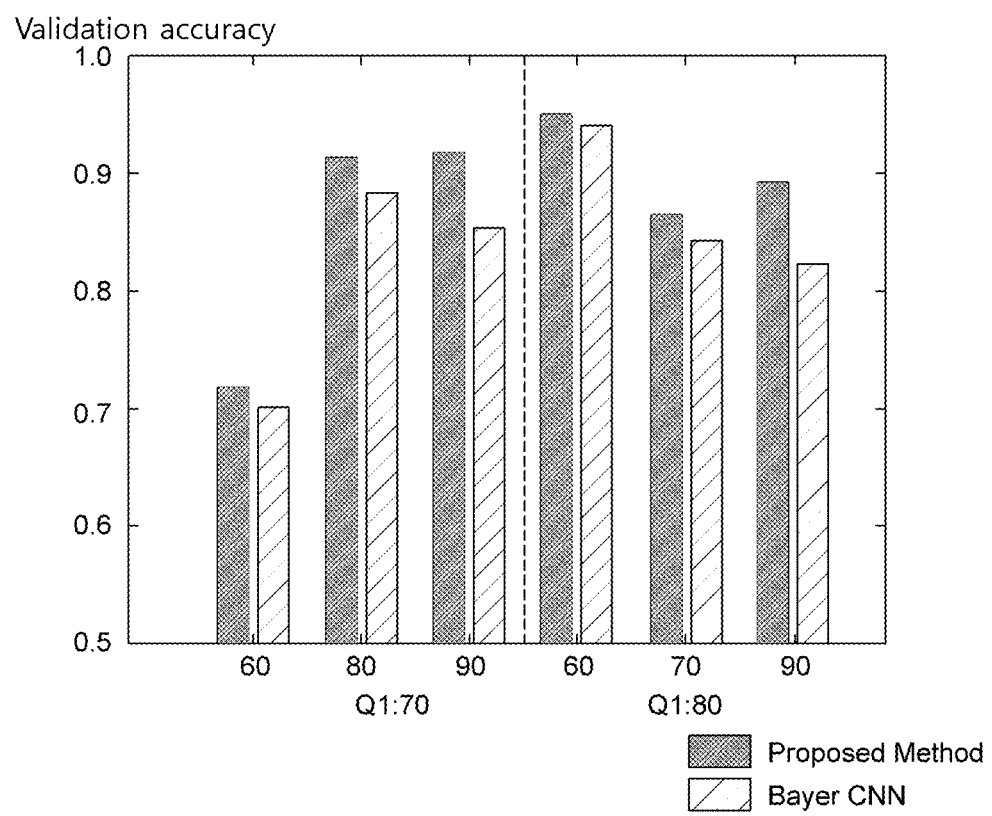
FIGS. 6a to 6d are graphs showing detection accuracy of a system for detecting image forgery through a convolutional neural network according to the first embodiment of FIGS. 2-4 in comparison with detection accuracy of the embodiment of FIG. 1 in various different environments.
Figure 6B:
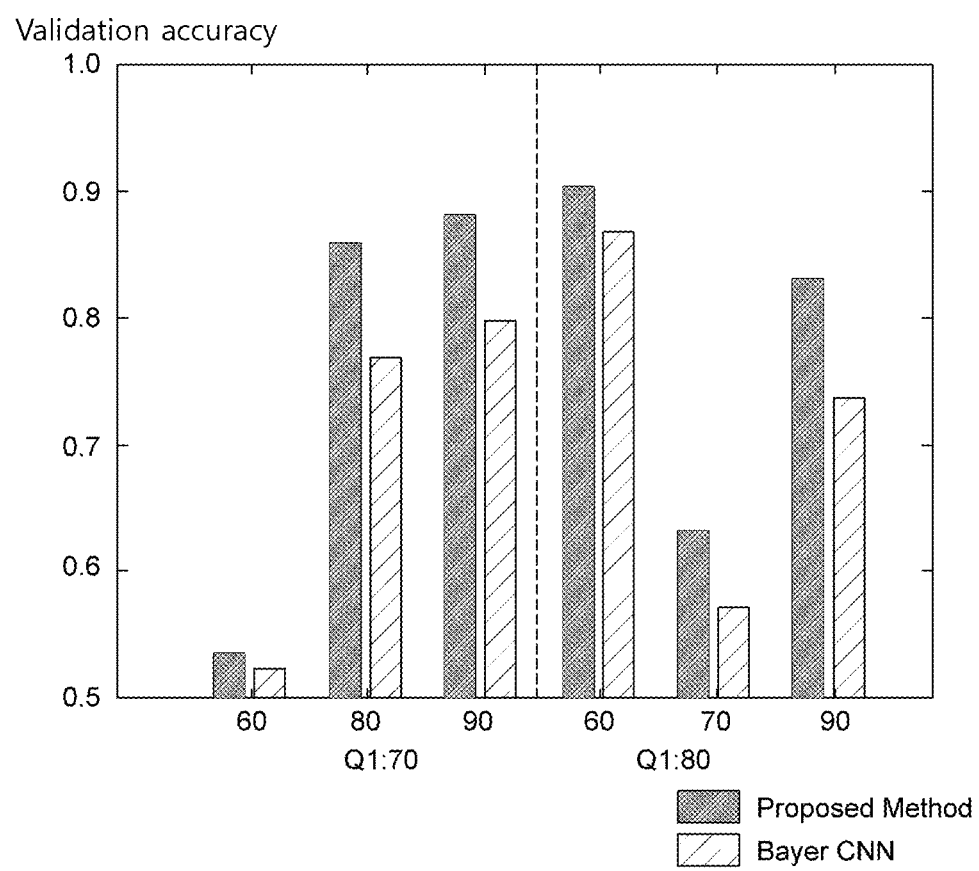
Figure 6C:
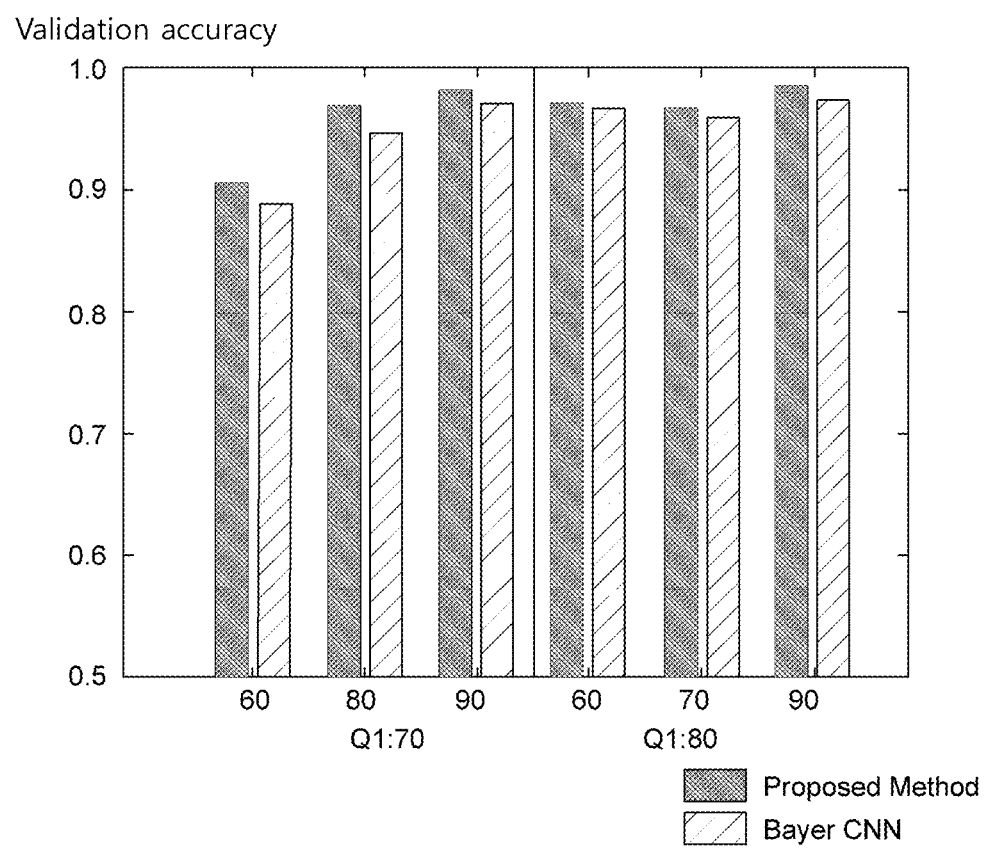
Figure 6D:
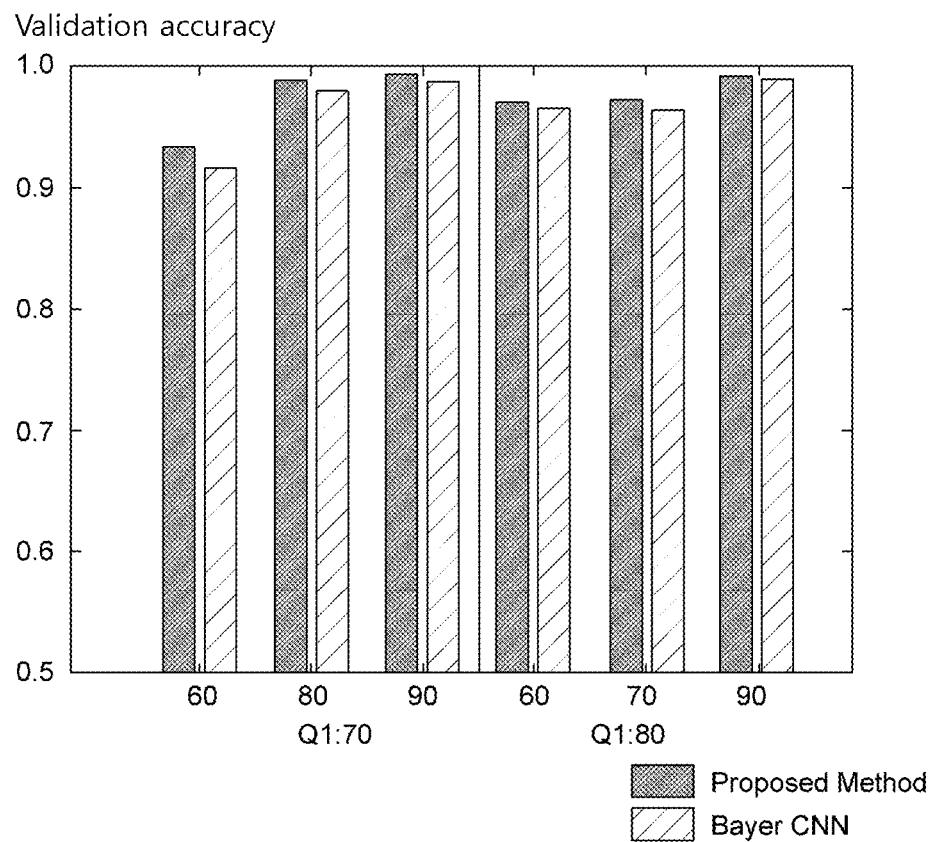

Referring to FIGS. 2 and 4, the Markov statistics-based network 200 according to the embodiment includes a domain conversion unit 210, a pixel difference calculating unit 220, a threshold function 230, a matrix transition unit 240, a second feature refining unit 250.

More specifically, the domain conversion unit 210 processes the image blocks generated by the image block unit 110 in the frequency domain by applying discrete cosine transform (DCT) to the image blocks. For example, the domain conversion unit 210 processes the original image blocks of the original image input to the network 100 in the frequency domain by applying the DCT to each eight-by-eight (8×8) image block.

The pixel difference calculating unit 220 applies a block $B_{x,y}$, for which discrete cosine transform has been applied, to Equation 2 below to obtain arrays of pixel differences from neighboring pixels in the horizontal and vertical directions, $B_h$, $B_v$.

$$B_h = B_{x,y} - B_{x+1,y}, (x \in [0,63], y \in [0,64])$$

$$B_v = B_{x,y} - B_{x,y+1}, (x \in [0,64], y \in [0,63])$$ [Equation 2]

Next, the threshold function 230 maps the array values into the threshold range of [−4, 4].

Next, the matrix transition unit 240 calculates a nine-by-nine (9×9) transition probability matrix (TPM) in the horizontal direction by using Equation 3 below from the values of the corresponding block, and combines two transition probability matrices in the horizontal and vertical directions into one-dimensional vector of [1, 9×9×2].

$$TPM_h(m, n) = Pr\{B_{x+1,y} = n \mid B_{x,y} = m\} \quad [\text{Equation 3}]$$
$$= \frac{\sum_{y=0}^{63} \sum_{x=0}^{62} \delta\{B_{x,y} = m, B_{x+1,y}=n\}}{\sum_{y=0}^{63} \sum_{x=0}^{62} \delta\{B_{x,y} = m\}}$$

where m,n∈[−4,4] and δ{A}=1 if A holds, otherwise 0

Afterwards, the combined one-dimensional vector is provided to the second feature refining unit 250. The second feature refining unit 250 may be built on fully connected layers.

The Markov statistics-based network 200 may be a network tailored to be suitable for two stream neural network handling image forensic techniques, which may accurately detect image manipulation even in a compressed image by transforming a single, double JPEG compressed image into the frequency domain and analyzing the compressed image therein.

4. Integrated Feature Refining Unit 310 and Manipulation Classifying Unit 320

The manipulated feature information output respectively from the constrained convolutional neural network 100 and the Markov statistics-based network 200 is provided to the integrated feature refining unit 310.

The integrated feature refining unit 310 comprises fully connected layers 311, 312 and attempts or operates learning for final classification by combining the feature information.

In order to prevent loss of minute data for image forensic, the integrated feature refining unit 310 according to an embodiment employs a structure of combining vectors of two fully connected layers without modification and delivering the combined vectors to the classifier instead of using an operation or method for determining a feature as an average value of the vector elements.

The manipulated feature information combined in the integrated feature refining unit 310 is output or delivered to the manipulation classifying unit 320.

The manipulation classifying unit 320 may detect pixels that might have been probably modified, calculate manipulation probabilities of the pixels, and extract the calculated probabilities in the form of a forgery confirmation map. For example, as shown in FIG. 5, pixels with a high probability of forgery may be identified via a forgery confirmation map in which different colors are assigned to the respective pixels according to their probability values.

The manipulation classifying unit 320 may include, for example, but not limited to, a softmax function and/or an Adam optimizer that may escape from a local minimum faster than the conventional stochastic gradient descent method.

More specifically, referring to FIG. 5, the system 10 for detecting image forgery through a convolutional neural network according to the embodiment may output a forgery detection result in a way that when an image altered from the original image (right images of FIGS. 5(*a*), (*c*), and (*e*)) is input, the pixels of the altered image are displayed with manipulation probability values (FIGS. 5(*b*), (*d*), and (*f*)).

The system 10 for detecting image manipulation may readily detect the image forgery even in a compressed image environment by combining the convolutional neural network 100 capable of detecting image forgery occurred in various compression environments and the Markov statistics-based neural network 200 that is able to take into account or analyze compression.

TABLE 1

| Manipulations | Q2 | Q1: 70 | | Q1: 80 | |
|---|---|---|---|---|---|
| | | Bayar's | Proposed | Bayar's | Proposed |
| Gaussian blurring (α = 0.4) | 60 | 70.35% | 71.98% | 94.25% | 95.04% |
| | 70 | — | — | 84.30% | 86.50% |
| | 80 | 88.23% | 91.23% | — | — |
| | 90 | 85.32% | 91.80% | 82.19% | 89.38% |
| Gaussian noise (α = 1) | 60 | 52.30% | 53.34% | 86.94% | 90.76% |
| | 70 | — | — | 57.23% | 63.25% |
| | 80 | 76.83% | 86.11% | — | — |
| | 90 | 79.94% | 88.34% | 73.84% | 83.27% |
| Median filtering (3 × 3) | 60 | 88.49% | 90.46% | 96.59% | 97.08% |
| | 70 | — | — | 95.86% | 96.69% |
| | 80 | 64.55% | 96.85% | — | — |
| | 90 | 97.04% | 98.10% | 97.33% | 98.58% |

TABLE 1-continued

| Manipulations | Q2 | Q1: 70 | | Q1: 80 | |
|---|---|---|---|---|---|
| | | Bayar's | Proposed | Bayar's | Proposed |
| Resampling (120%) | 60 | 91.58% | 93.41% | 96.41% | 97.13% |
| | 70 | — | — | 96.34% | 97.23% |
| | 80 | 98.10% | 98.94% | — | — |
| | 90 | 99.01% | 99.23% | 98.91% | 99.30% |

More specifically, Table 1 shows detection rates of image forgery via a deep learning network of the embodiment of FIG. 1 (Bayas) and a network according to the first embodiment of FIGS. 2-4.

As shown in Table 1, the two networks have been used for experiments for detecting a total of four types of image alteration (Gaussian blurring, Gaussian noise, median filtering, and resampling) in a doubly compressed image.

As shown in Table 1, for all the alterations and various compression qualities (Q1=70, 80/Q2=60, 70, 80, 90), the network of the first embodiment of FIGS. 2-4 shows superior performance to the Bayar method of the embodiment of FIG. 1.

Also, referring to FIGS. 6a to 6d, the detection accuracy graphs show that the network of the first embodiment of FIGS. 2-4 shows a higher detection rate than the embodiment of FIG. 1 for each learning period according to the respective image alteration types.

Second Embodiment—System for Detecting Image Forgery Through Convolutional Neural Network A system 20 for detecting image forgery through a convolutional neural network according to a second embodiment will be described, and descriptions repeating those of the first embodiment described above will be omitted.

Figure 7:
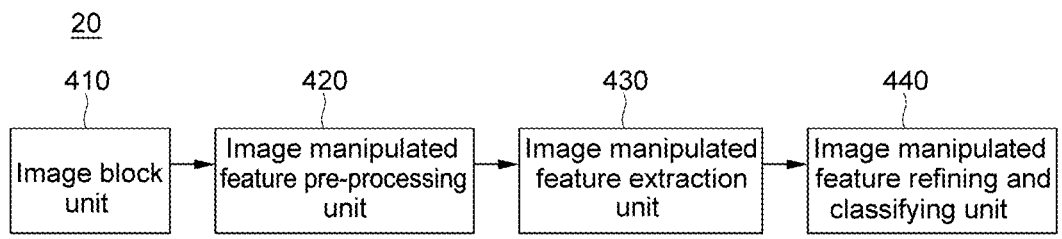
FIG. 7 is a block diagram of a system for detecting image forgery through a convolutional neural network according to a second embodiment of the present disclosure.
Figure 8:
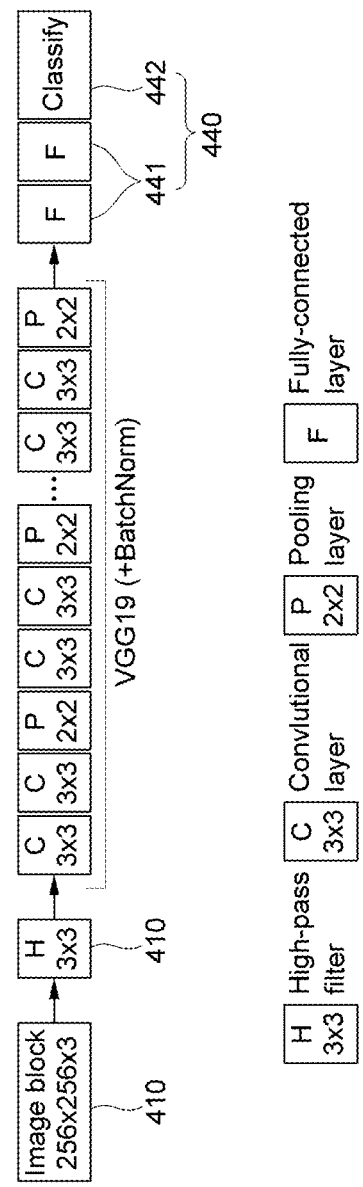
FIG. 8 is a block diagram of a system for detecting image forgery through a convolutional neural network according to the second embodiment of the present disclosure.

Referring to FIGS. 7 and 8, the system 20 for detecting the image forgery through the convolutional neural network according to the second embodiment includes an image block unit 410, an image manipulated feature pre-processing unit 420, an image manipulated feature extraction unit 430, and an image manipulated feature refining and classifying unit 440 including an image manipulated feature refining unit 441, and an image manipulation classifying unit 442.

More specifically, referring to FIGS. 7 to 8, the image block unit 410 may adjust or change the size of an input image to be suitable as an input to the convolutional neural network. For instance, the suitable size of the input image may be preset.

The system 20 for detecting the image forgery through the convolutional neural network according to the second embodiment may be suitable for analyzing color images, where an input image is a color image and may comprise a plurality of layers, each of which is configured for the corresponding color component.

For example, the image block unit 410 may partition the original image into image blocks of two hundred fifty six by two hundred fifty six by three (256×256×3).

Next, the image blocks are input to the manipulated feature pre-processing unit 420.

The manipulated feature pre-processing unit 420 may enhance manipulated features of the image by using, for example, but not limited to, a high-pass filter.

For instance, the manipulated feature pre-processing unit 420 may enhance resize trace features by using the high-pass filter.

The manipulated feature pre-processing unit 420 may use an operation for finding information hidden in an image which is similar to the image forensic technique.

Image blocks with the enhanced resize feature may be input to the image manipulated feature extraction unit 430.

The manipulated feature extraction unit 430 may extract image manipulated features by using a pre-trained deep learning convolutional neural network model.

More specifically, the manipulated feature extraction unit 430 may include a plurality of convolutional layers, batch normalization, rectified linear unit (ReLU), and a plurality of max pooling layers.

The manipulated feature extraction unit 430 according to an embodiment may be, for instance, but not limited to, a pre-trained Visual Geometry Group (VGG) 19 convolutional neural network model. For example, the manipulated feature extraction unit 430 may have a structure in which two convolutional layers, a pooling layer, two convolutional layers, a pooling layer, four convolutional layers, a pooling layer, and two convolutional layers are stacked sequentially. VGG19 is a convolutional neural network that is trained on more than a million images from the ImageNet database (http://www.image-net.org). However, in various embodiments, any type of a pre-trained convolutional neural network model may be used.

At this time, the manipulated feature extraction unit 430 may have a pre-trained convolutional neural network model and/or a model in which weights are varied according to an input image.

For example, the manipulated feature extraction unit 430 may be trained to extract VGG features by modifying weights for a pre-trained VGG19 convolutional neural network according to the input image.

Also, because a plurality of convolutional layers belonging to the manipulated feature extraction unit 430 are stacked one after another, it is preferable that the kernel size of all of the convolutional layers is less than three-by-three (3×3). Also, the stride of each convolutional layer may be fixed to one (1) not to miss traces of image manipulation, and only the pooling layer may be set to an integer of two (2) or more.

And, the manipulated feature information extracted from the manipulated feature extraction unit 430 is input to the feature refining unit 441.

The feature refining unit 441 may include fully connected layers and may be trained to refine and distinguish the extracted image manipulated features.

More specifically, the feature refining unit 441 may include at least one or more fully connected layers and may be trained to refine and distinguish the extracted image manipulated features.

In the embodiment, the feature refining unit 441 may comprise two fully connected layers F where a rectified linear unit is connected to the output of each fully connected layer F.

The manipulated feature information combined in the feature refining unit 441 is input or delivered to the manipulation classifying unit 442.

The manipulation classifying unit 442 may detect pixels that might have been probably modified and calculate manipulation probabilities of the pixels.

And, the manipulation classifying unit 442 may calculate and represent a probability of manipulation of an image block ranging from 0 to 1 through the softmax function.

More specifically, the manipulation classifying unit 442 may include the softmax function and the Adam optimizer that may escape from a local minimum faster than the conventional stochastic gradient descent method.

The system 20 for detecting image forgery through a convolutional neural network as designed above may not only detect image manipulation frequently occurred in various image compression environments but also detect forgery of color images fast and reliably.

In what follows, to check performance of a network according to the second embodiment of FIGS. 7 and 8, accuracy of forgery extraction is calculated by providing an image with a resize ratio different from the embodiment of FIG. 1.

Figure 9A:
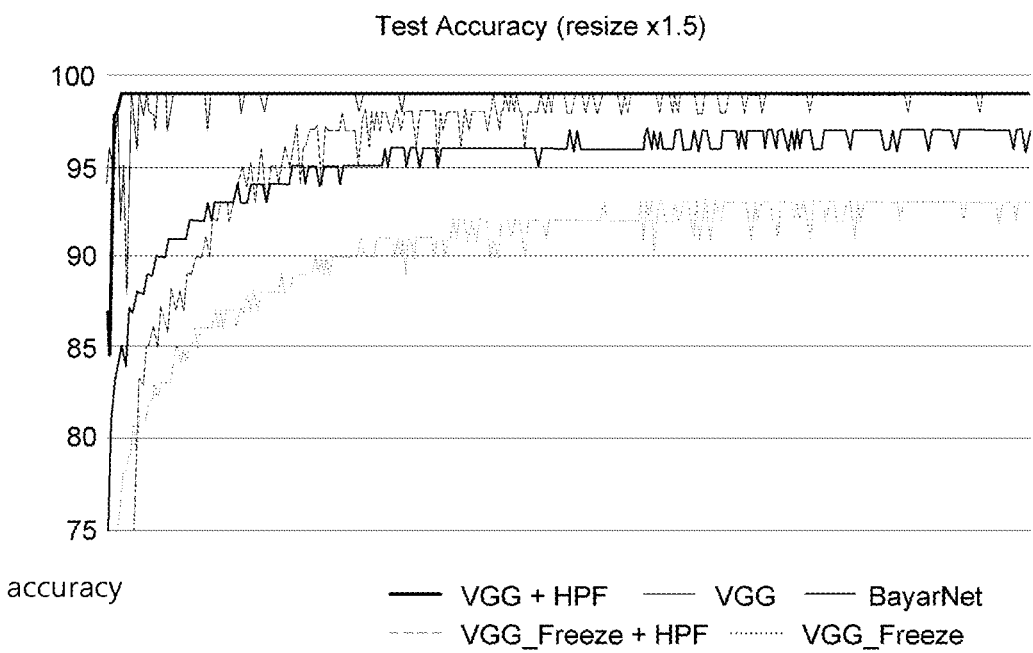
FIGS. 9a to 9c are graphs showing image forgery detection accuracy of different neural network systems with respect to images with different resize ratios.
Figure 9B:
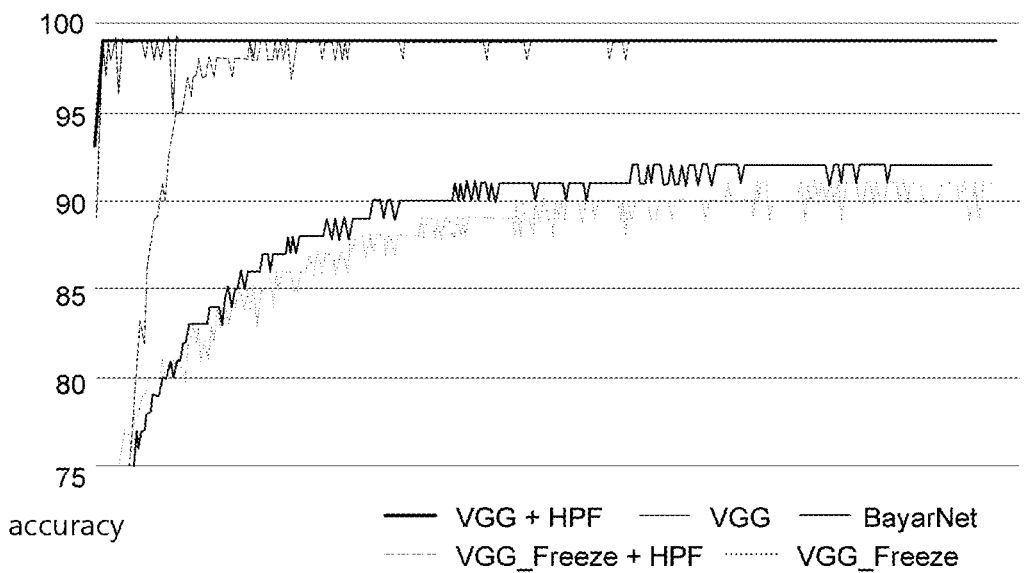
Figure 9C:
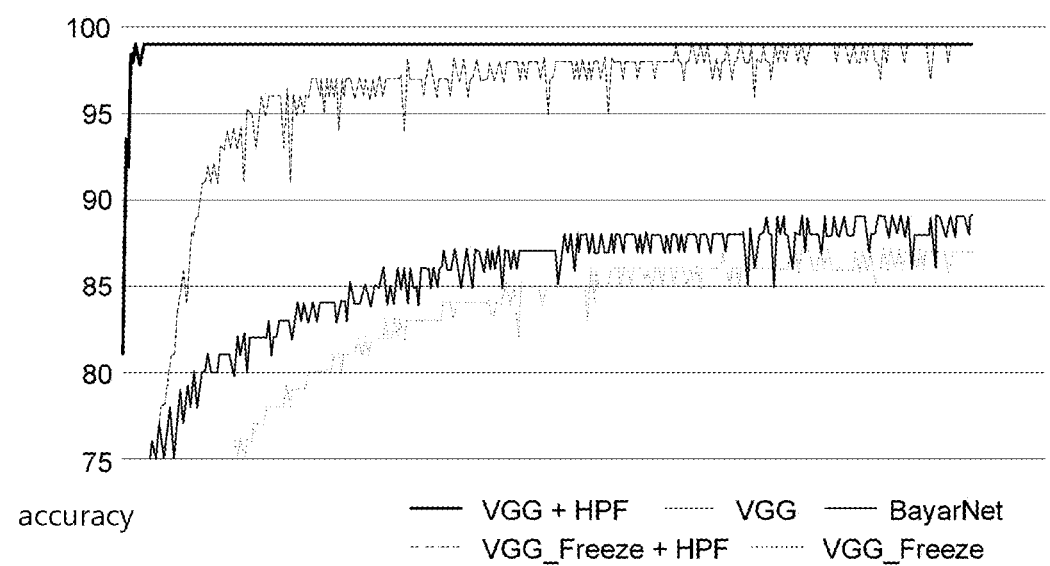

Referring to FIGS. 9a to 9c, it may be seen that for all resize ratios, the network according to the second embodiment of FIGS. 7 and 8 is trained and operated faster than the network based on the embodiment of FIG. 1, and the accuracy of forgery extraction is also higher.

<Non-Manipulation Detection Service>

In what follows, described in detail will be a method for providing a non-manipulation service by using a system 10, 20 for detecting image forgery through a convolutional neural network according to the embodiment described above.

For example, the service may be provided through the user's terminal, and manipulation detection may be conducted by a non-manipulation detection service providing server.

In other words, the user may receive a service in such a way that the user accesses the service providing server through the user's terminal, uploads an image in question, and receives an image confirmed by the service providing server.

Figure 10:
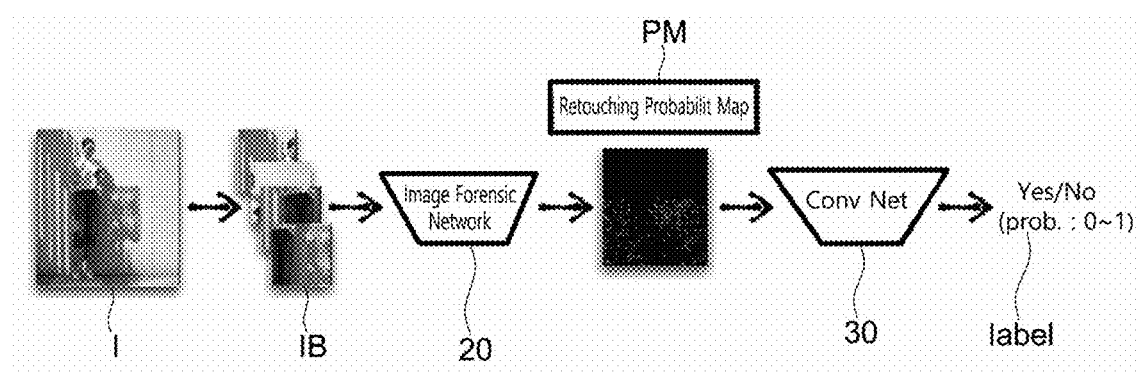
FIG. 10 is a flow diagram illustrating a method for providing a manipulation or non-manipulation detection service according to an embodiment of the present disclosure.

Referring to FIG. 10, the user may provide an input image (I) suspected for forgery through the terminal.

More specifically, the user may request confirmation of image forgery by transmitting an image stored in the terminal to the service providing server.

The service providing server may partition the input image (I) to generate image blocks (IBs) and provide the generated image blocks (IBs) to the system 10, 20 for detecting the image forgery through the convolutional neural network.

The system 10, 20 for detecting the image forgery through the convolutional neural network may perform deep learning of the input image blocks (IBs) and extract a probability map (PM) for confirming image forgery which displays pixels suspected for forgery and forgery probability of the pixels.

The service providing server may again perform deep learning of the probability map (PM) for confirming image forgery through the convolutional neural network and output a label of Yes or No to indicate image forgery of the input image (I).

At this time, if the image forgery is determined to be "Yes", the convolutional neural network may determine which forgery type has been found from positions and arrays of pixels having a high probability of the image forgery and generate an image having highlighted regions at a high possibility of image forgery.

Figure 11:
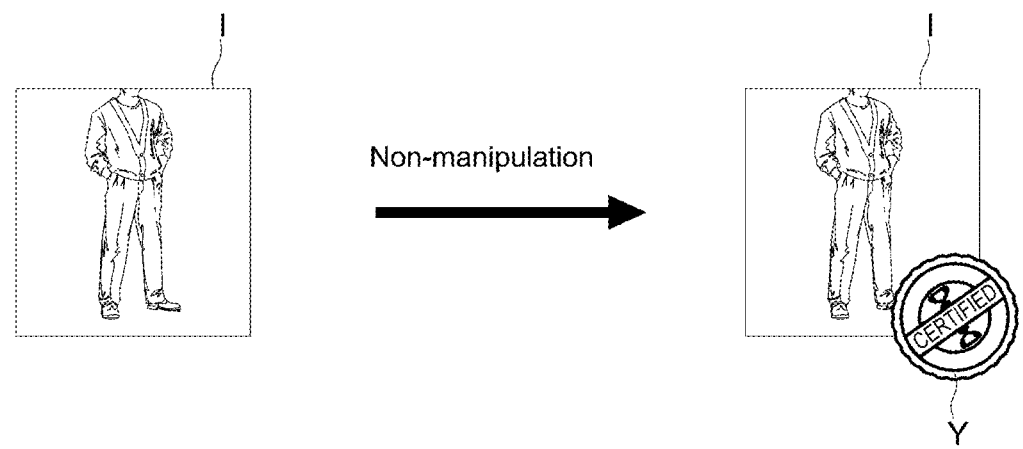
FIG. 11 illustrates an example of an output of a manipulation or non-manipulation detection service adding a non-manipulation confirmation stamp on an image when the image has not been manipulated according to an embodiment of the present disclosure.

More specifically, referring to FIG. 11, if the image forgery is determined to be "No", the service providing server may synthesize a stamp (Y) which confirms that image forgery has not been found in the input image (I) and provide the input image synthesized with the stamp to the user.

Figure 12:
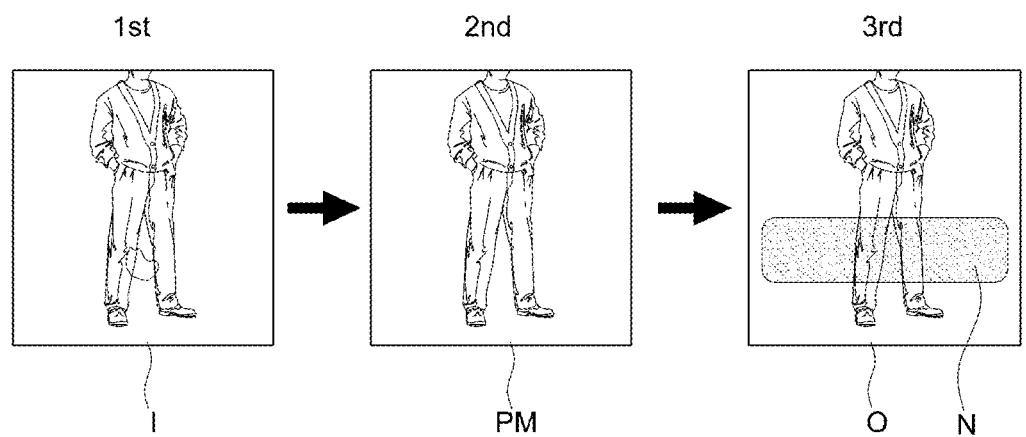
FIG. 12 illustrates examples of outputs of a manipulation or non-manipulation detection service highlighting an area suspected for forgery when an image manipulation is detected according to an embodiment of the present disclosure.

Also, referring to FIG. 12, if the image forgery is determined to be "Yes", the service providing server may highlight regions (N) of the input image (I) with a high possibility for the image forgery and further display forgery type information.

As described above, according to some embodiments of the present disclosure, the method for providing a non-manipulation detection service may be capable of accurately determining image forgery even when an input image is a color image, and enable the user to intuitively recognize the determination result of the image forgery by providing the probability map.

According to some embodiments of the present disclosure, a system for detecting image forgery through a convolutional neural network may detect image manipulation with less resource and better performance even in a compressed image environment by combining a convolutional neural network detecting image manipulation frequently occurred in a various image compression environments and a neural network based on Markov statistics which takes into account compression.

Also, according to certain embodiments of the present disclosure, a system for detecting image forgery through a convolutional neural network may detect image manipulation frequently occurred in various image compression environments as well as detect forgery of color images fast and reliably.

Additionally, according to some embodiments of the present disclosure, a method for providing a non-manipulation detection service may provide an advantage that it is capable of accurately determining image manipulation even when an input image is a color image, and enable the user to intuitively recognize the determination result.

In the present disclosure, a "unit" may refer to a hardware based unit, a software based unit or a combination of hardware and software. The hardware based unit may include self-contained components such as chipsets, specialized circuitry and one or more memory devices, while the software-based unit may be part of a program code or linked to the program code containing specific programed instructions, which may be loaded in memory. The "unit" (whether hardware, software, or a combination thereof) may be designed to implement or execute one or more particular functions or routines.

The embodiments of the present disclosure may be implemented in the form of program commands which may be executed through various constituting elements of a computer and so may be recorded in a computer-readable recording medium. The computer-readable recording medium may include program commands, data files, and data structures separately or in combination thereof. The program commands recorded in the computer-readable recording medium may be those designed and composed specifically for the present disclosure or may be those commonly available for those skilled in the field of computer software. Examples of a computer-readable recoding medium may include magnetic media such as hard-disks, floppy disks, and magnetic tapes; optical media such as CD-ROMs and DVDs; and hardware devices specially designed to store and execute program commands such as ROM, RAM, and flash memory. Examples of program commands include not only machine codes such as those generated by a compiler but also high-level language codes which may be executed by a computer through an interpreter and the like. The hardware device may be composed to be operated by one or more software modules to perform the operations of the present disclosure, and vice versa.

Specific implementation of the present disclosure are embodiments, which does not limit the technical scope of the present disclosure in any way. For the clarity of the specification, descriptions of conventional electronic structures, control systems, software, and other functional aspects of the systems may be omitted. Also, connection of lines between constituting elements shown in the figure or connecting members illustrate functional connections and/or physical or circuit connections, which may be replaceable in an actual device or represented by additional, various functional, physical, or circuit connection. Also, if not explicitly stated otherwise, "essential" or "important" elements may not necessarily refer to constituting elements needed for application of the present disclosure.

Also, although detailed descriptions of the present disclosure have been given with reference to preferred embodiments of the present disclosure, it should be understood by those skilled in the corresponding technical field or by those having common knowledge in the corresponding technical field that the present disclosure may be modified and changed in various ways without departing from the technical principles and scope specified in the appended claims. Therefore, the technical scope of the present disclosure is not limited to the specifications provided in the detailed descriptions of this document but has to be defined by the appended claims.

What is claimed is:

1. A system for detecting image forgery through a convolutional neural network, the system comprising:
one or more processors; and
memory storing executable instructions that, if executed by the one or more processors, configure the one or more processors to:
apply an input image to a high-pass filter to enhance features associated with the image forgery;
extract image manipulated feature information from the image applied to the high-pass filter through a pre-trained convolutional neural network;
refine the image manipulated feature information;
determine the image forgery of the input image based on the refined image manipulated feature information by detecting pixels that have been probably manipulated in the input image and calculating manipulation probability values of the pixels; and
output an image forgery confirmation map displaying probability of the image forgery of pixels in different colors according to the calculated manipulation probability values.

2. The system of claim 1, wherein the one or more processors are configured to process the input image into blocks of a predetermined size.

3. The system of claim 1, wherein the one or more processors are configured to extract the image manipulated feature using a plurality of convolutional layers and a plurality of pooling layers.

4. The system of claim 3, wherein the convolutional layers have a kernel size smaller than three-by-three (3×3) and have a stride of one (1).

5. The system of claim 3, wherein the one or more processors are configured to extract the image manipulated feature information based on a pre-trained Visual Geometry Group (VGG) 19 convolutional neural network model, and the one or more processors change and train weights of the convolutional neural network according to the input image.

6. The system of claim 1, wherein the input image is a color image.

7. The system of claim 1, wherein the one or more processors are configured to:

perform deep learning of the image forgery confirmation map;

output a determination result of whether the image forgery has been made or not;

if the image forgery has been made, highlight areas of the input image which have probability of the image forgery higher than a threshold and display the input image with the highlighted areas and forgery type information of the input image; and if the image forgery has not been made, display the input image with a stamp image which confirms that the image forgery has not been made in input image, and wherein the displayed forgery type information is one of types of image alterations manipulated by each of Gaussian blurring, Gaussian noise, median filtering and resampling.

8. A method for detecting image forgery performed by a processor of a terminal, the method comprising:

receiving an input image for determining the image forgery;

applying the input image to a high-pass filter to enhance features associated with the image forgery;

extracting image manipulated feature information from the image applied to the high-pass filter through a pre-trained convolutional neural network;

refining the image manipulated feature information;

determining the image forgery of the input image based on the refined image manipulated feature information, wherein the determining of the image forgery of the input image includes detecting pixels that have been probably manipulated in the input image and calculating manipulation probability values of the pixels; and outputting an image forgery confirmation map displaying probability of the image forgery of the pixels in different colors according to the calculated probability values.

9. The method of claim 8, further comprising processing the image into blocks of a predetermined size.

10. The method of claim 8, wherein the pre-trained convolutional neural network is a pre-trained VGG19 convolutional neural network model, and weights of the convolutional neural network are changed and trained according to the input image.

11. The method of claim 8, wherein the input image is a color image.

12. The method of claim 8, further comprising:

performing deep learning of the image forgery confirmation map;

outputting a determination result of whether the image forgery has been made or not;

if the image forgery has been made, highlighting areas of the input image which have probability of the image forgery higher than a threshold and displaying the input image with the highlighted areas and forgery type information of the input image;

if the image forgery has not been made, displaying the input image with a stamp image which confirms that the image forgery has not been made in input image, and wherein the displayed forgery type information is one of types of image alterations manipulated by each of Gaussian blurring, Gaussian noise, median filtering and resampling.

\* \* \* \* \*